P. SCHMITT.
FENDER FOR CULTIVATORS.
APPLICATION FILED MAR. 30, 1914.
1,154,063.
Patented Sept. 21, 1915.
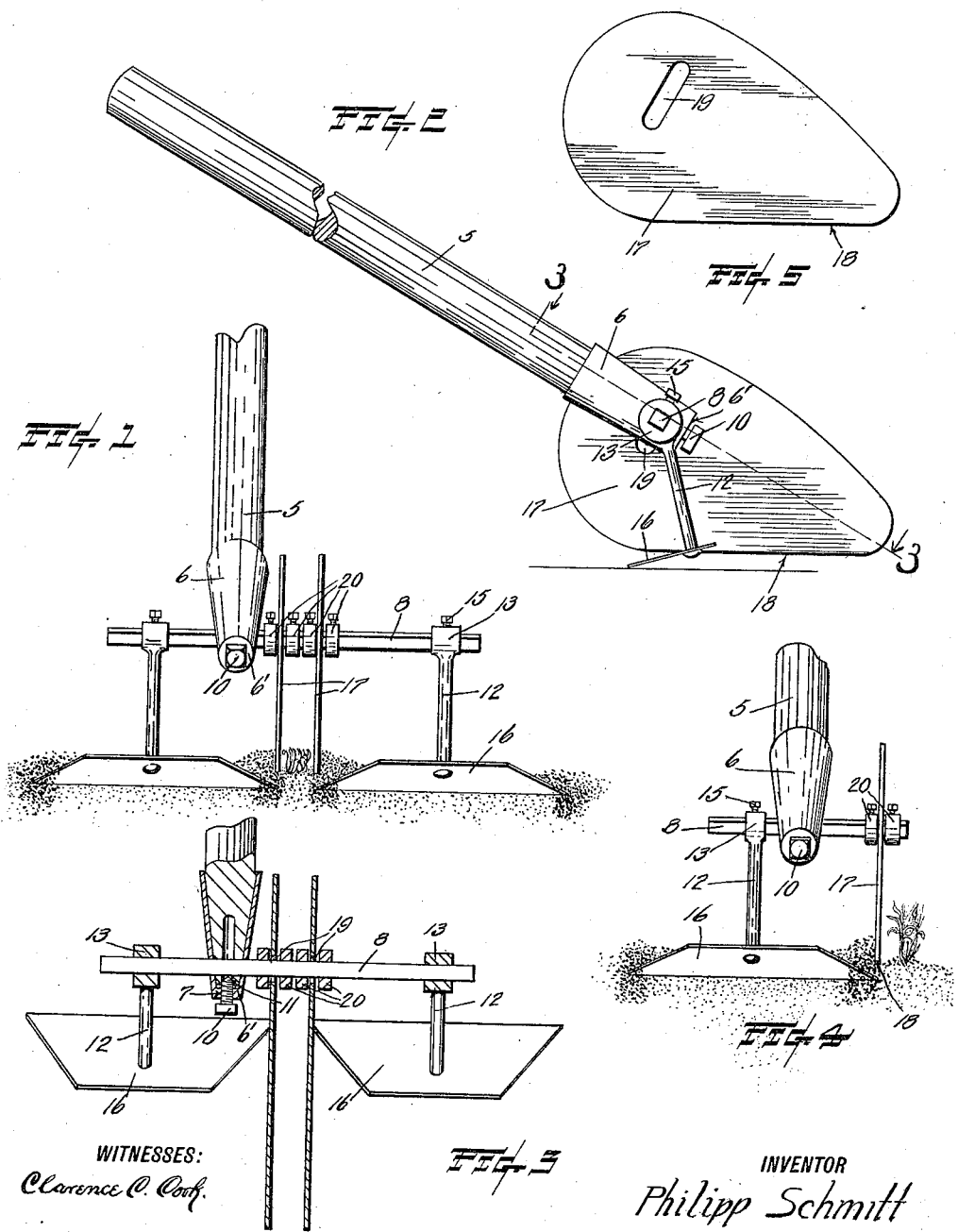
WITNESSES:
Clarence C. Cook.
Horace Barnes
INVENTOR
Philipp Schmitt
BY
Piere Barnes
ATTORNEY
COLUMBIA PLANOGRAPH CO., WASHINGTON, D. C.

UNITED STATES PATENT OFFICE.

PHILIPP SCHMITT, OF PORT ORCHARD, WASHINGTON.

FENDER FOR CULTIVATORS.

1,154,063.   Specification of Letters Patent.   Patented Sept. 21, 1915.

Application filed March 30, 1914.   Serial No. 828,118.

*To all whom it may concern:*

Be it known that I, PHILIPP SCHMITT, a citizen of the United States, residing at Port Orchard, in the county of Kitsap and State of Washington, have invented certain new and useful Improvements in Fenders for Cultivators, of which the following is a specification.

This invention relates to improvements in gardening tools, and particularly to hand fenders for cultivators employed in stirring the soil about the roots of small plants, removing weeds, and the like.

The object of the invention is the provision of a simple, strong and inexpensive tool that will be serviceable and convenient in general use and particularly advantageous in cultivating about the roots of small plants whereby the soil moved by the tool is prevented from deflection upon the plants and burying them under a load of earth.

In market gardening it is often impracticable to cultivate young seedlings soon enough after they first appear above ground to prevent the undue growth of weeds thereabout owing to the danger of loading the loosened earth upon the young plants before they are tall enough to stand the movement of earth about their roots.

The present invention is designed to guard the plants from such danger and to provide a tool of such generally useful character that it may be employed advantageously for the usual purposes of such tools.

The invention consists in the novel construction, adaptation and combination of parts of a cultivator, as will be fully described in the following specification, illustrated in the accompanying drawings, and finally set forth in the appended claim.

In said drawings, Figure 1 is a view in front elevation of a double-cultivator embodying my invention. Fig. 2 is a side elevational view of the same. Fig. 3 is a sectional view through 3—3 of Fig. 2. Fig. 4 is a front elevational view of a single-cultivator of my invention. Fig. 5 is a plan view of an element of the invention, shown detached.

Referring to said views, the reference numeral 5 designates a handle provided with a ferrule 6 at its lower end which may be formed tapering, as shown, and terminating in a frustum-wall $6^1$ provided with an axially arranged threaded hole 7. A transversely disposed opening is made through said ferrule and handle-end socketed therein for the adjustable reception of a metal bar 8 at right angles to said handle. Said bar may desirably be formed of rectangular cross-section and of such lengths as to adapt itself to the purposes hereinafter explained. It is retained in adjusted position relative to the ferrule and handle by means of a setscrew 10 threaded in said hole 7 passing through an alined recess 11 in the end of said handle. Said bar is adjusted in said opening to project for a suitable distance upon each side of said handle and the various instrumentalities employed in stirring the soil and the like may desirably be positioned as symmetrically thereon and with respect to the handle as may be desired to afford balance and efficient use thereof.

Various types of ground-working attachments may be provided for the cultivator; that illustrated consisting in a shank 12 formed at one end with an apertured boss 13 adapted to receive said bar 8 and secured in adjusted positions thereon by set-screw 15. At its opposite end said shank is provided with a cultivator-blade 16 set at relatively with a slight angularity with the ground and extending laterally for a relatively considerable distance.

17 designates a guard adapted to be attached to said bar in proximity of one of the lateral extremities of each said blades 16. It is desirably formed of sheet metal of any suitable configuration but is preferably of elongated shape in the direction of the axis of the handle 5 while its lower edge 18 is approximately parallel with the ground-plane. Said guard is secured to said bar at its forward or leading end by an elongated slot 19 whose width is somewhat greater than the thickness of said bar 8 to afford a sliding connection therewith and whose length is transverse to the major axis of the guard. Said guard is connected to said bar by introducing the latter through said slot and positioning a set-collar 20 upon each side thereof to allow of vertical movement of the guard within the limit of said slot and maintaining the same in substantially erect position.

The manner of using the described devices may be readily explained. When the ground-working attachment is suitably positioned upon the bar and at the proper angle to accomplish the work desired, a guard 17 is likewise positioned at one edge of the blade of said attachment upon the side thereof adjacent the row of plants being cultivated, the purpose being to shield the young plants from being smothered by the loose earth displaced by the blade in its progress. As the tool is drawn forwardly, the blade is manipulated to enter the ground to stir the soil while the guard rests lightly upon the soil, its relatively loose connection upon the bar allowing it to accommodate itself to the inequalities of the surface and interpose an effective barrier between the blade and the row of plants without being forced into the ground and causing friction thereby and the expenditure of greater effort upon the part of the operator.

It may be seen that the tool can be readily adapted to be used as a double cultivator working upon both sides of a row as illustrated in Figs. 1 and 3, or as in Fig. 4 as a single cultivator. In the latter view, the bar 8 is shown as of shorter length than in the other views, and it is obvious that the dimensions of the various parts and devices may be on any suitable scale.

The invention is extremely simple and is correspondingly efficient and practical in operation.

Having described my invention, what I claim, is—

The combination with a ground-working implement, of a guard plate, said plate having its lower edge normally parallel with the ground and having the forward portion thereof of increased side elevational area relative to the rear end, the upper edge of the guard plate being inclined rearwardly and downwardly, said plate having an elongated opening in the forward end with the major axis arranged in a direction transverse to the major axis of the guard, said plate adapted to be loosely mounted on said implement, and spacing collars arranged to limit the lateral movement of said plate on said implement, said plate adapted to be bodily moved relative to said element to compensate for unevenness of the ground.

Signed at Seattle, Washington, this 23d day of March, 1914.

PHILIPP SCHMITT.

Witnesses:
 HORACE BARNES,
 E. PETERSON.

Copies of this patent may be obtained for five cents each, by addressing the "Commissioner of Patents, Washington, D. C."